March 24, 1959   J. O. GARRISON ET AL   2,879,070
LOCATING STUD
Filed Nov. 7, 1957   2 Sheets-Sheet 1
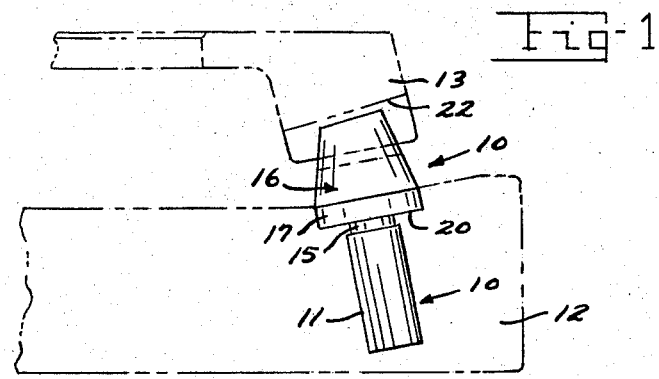
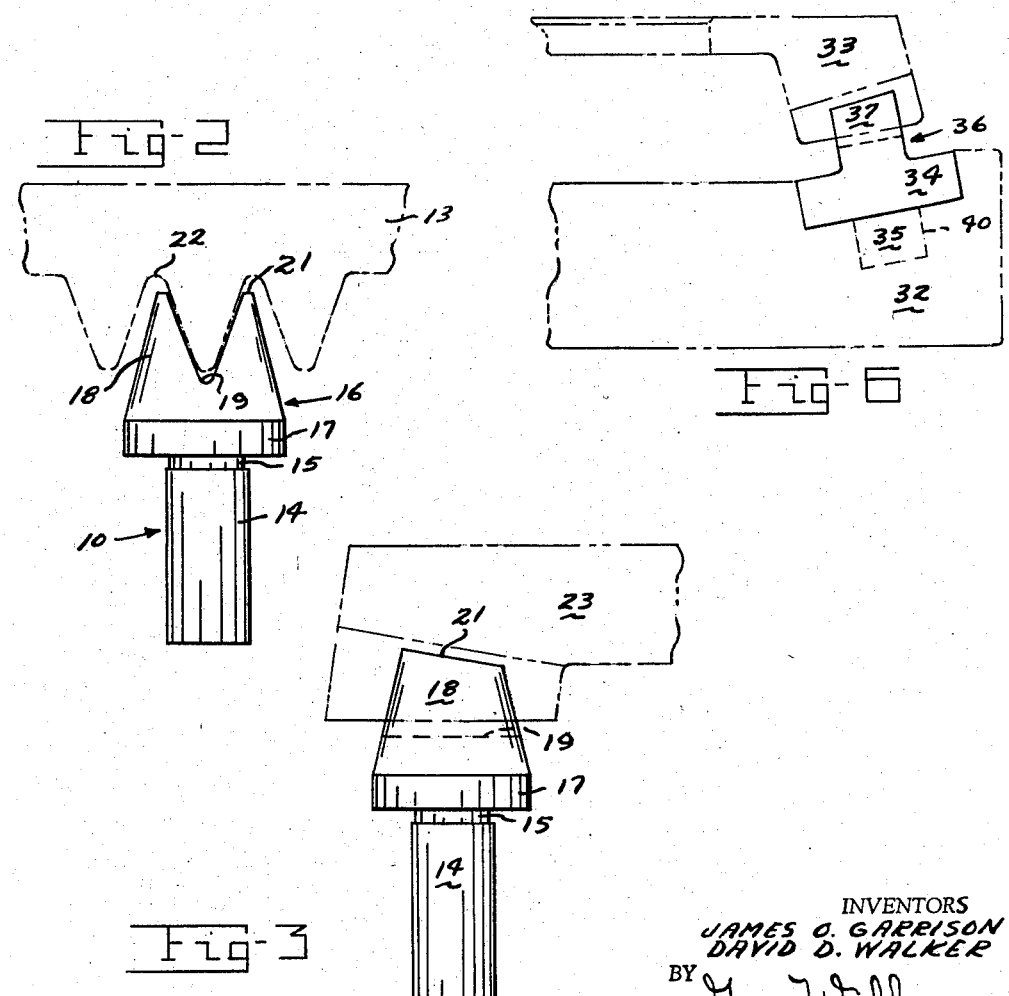
INVENTORS
JAMES O. GARRISON
DAVID D. WALKER
BY Tom Walker
ATTORNEY March 24, 1959     J. O. GARRISON ET AL     2,879,070
LOCATING STUD Filed Nov. 7, 1957     2 Sheets-Sheet 2

INVENTORS
JAMES O. GARRISON
DAVID D. WALKER
BY Tom Walker
ATTORNEY

United States Patent Office 2,879,070
Patented Mar. 24, 1959

2,879,070

LOCATING STUD

James O. Garrison and David D. Walker, Dayton, Ohio, assignors to Garrison Machine Works, Inc., Dayton, Ohio, a corporation of Ohio Application November 7, 1957, Serial No. 694,981

12 Claims. (Cl. 279—123)

This invention relates to chucks and more specifically to an improved locator stud which is particularly applicable to gear chucks.

While the invention will be particularly described herein with reference to its application to gear chucks, it will be readily apparent to those versed in the art that the application of the invention is not so limited, nor is such intended.

Located studs are employed on gear chucks to project therefrom and engage between successive teeth on a gear as it is being chucked to position the gear for the necessary machining operation. In the prior art, these locator studs generally consist of a cylindrical element having a conical head. Such studs are subject to considerable wear and relatively quick deformation. Even slight wear of the conical head can result in a degree of play in the gear applied and consequent inaccuracies in working the gear.

The present invention provides an improved and more positive locator means for gear chucks which has an extended and more efficient operating life. The present invention results in a device which basically provides a lateral containment of one or more gear teeth for quick and accurate gear positioning and positive resistance to displacement of the gear once it is chucked. The invention contemplates that the improved locator means shall consist of a separable unit which may be easily applied to the operating surface of a chuck and be readily interchanged in a minimum of time and with a minimum of effort.

A primary object of the invention is to improve the construction as well as the means and mode of operation of locating studs whereby they may not only be economically manufactured, but will be more efficient and satisfactory in use, substantially uniform in operation throughout their useful life, and be unlikely to get out of repair.

A further object of the invention is to provide an improved locating stud which is particularly advantageous in its application to gear chucks.

A further object of the invention is to provide an improved locating means, which may be interchangeably applied to gear chucks and the like, including a stud having a bifurcated extremity for positively positioning and containing a gear on chucking thereof.

A further object of the invention is to provide a locating stud which is particularly applicable to gear chucks and which is subject to minimum wear in operation.

An additional object of the invention is to provide an improved locating means for gear chucks consisting of a separable plate releasably seated in the operating face of a chuck body which has spaced means in connected relation for simultaneously laterally and oppositely engaging teeth on a gear to positively locate it as it is being chucked.

Another object of the invention is to provide an improved locator means for gear chucks adapted to resiliently receive and contain teeth of a gear as it is being chucked and to effect a substantially co-extensive surface engagement therewith.

A further object of the invention is to provide improved locator studs possessing the advantageous structural features, the inherent meritorious characteristics and the mode of operation herein described.

With the above primary and other objects in view, as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein are illustrated preferred but not necessarily the only forms of embodiment of the invention:

Fig. 1 is a fragmentary view of a gear being chucked, illustrating the use of an improved locating stud in accordance with the invention;

Fig. 2 is a side view of the locator stud of Fig. 1 showing its engagement to the gear being chucked;

Fig. 3 is a fragmentary view illustrating a modification of the application of a locator stud of the nature shown in Figs. 1 and 2;

Fig. 6 is a fragmentary view similar to that shown in Fig. 1 illustrating a further embodiment of the invention;

Like parts are indicated by similar characters of reference throughout the several views.

Figure 4:
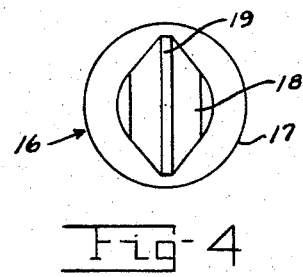
Fig. 4 is a plan view of the operating face of the locator stud shown in Figs. 1–3.

A locator stud 10 in accordance with the invention is shown in Fig. 1 in press fit relation within a stepped recess 11 in the operating face of a chuck body 12. The chuck body 12 has the portion of its operating face to which the stud 10 seats generally parallel to the face of a bevel gear 13 which is being chucked.

The locator stud 10 includes a cylindrical shank portion 14 which has a necked portion 15 to one end integrally connecting it to an enlarged bifurcated head 16. The head 16 includes a substantial base portion 17 immediately connecting to neck portion 15 and the bifurcated extremity consists of a pair of spaced generally identically tapered projections 18 defining a tapered groove 19 therebetween. The adjacent walls of the projections 18 which define the groove 19 are angularly related to converge inwardly to the base of the head 16 and generally conform to the cross sectional shape of the teeth of the gear being chucked, thus adapting it to receive and contain a tooth of such nature in a manner to be further described.

With further reference to the chuck body 12, the stepped recess 11 is angularly disposed to have its central axis perpendicular to the portion of the chuck operating face in which the stud 10 seats. The recess 11 is cylindrical in nature to nest the shank 14 in press-fit relation thereto and is expanded adjacent the operating face of the chuck to provide a shoulder 20 to which the base portion 17 of the bifurcated head 16 seats. As illustrated, only the projections 18 defining the central groove 19 are in projecting relation to the operating face of the chuck. In the particular embodiment of the invention described, the projections 18 terminate in a plane angularly related to the central axis of the stud, providing substantially planar surfaces 21 at their extremities adapted to seat substantially parallel to the land portions 22 intermediate the teeth on the gear being chucked.

It will be readily seen that one or more of the locator studs 10 may be employed in the operating face of a chuck body 12 in the manner illustrated in Figures 1 and 2 of the drawings. Each stud functions as follows. As the gear 13 is directed inwardly to the operating face of the chuck, automatically or otherwise, the angularly disposed walls defining the groove 19 will initially either individually or jointly engage a gear tooth. As the gear moves inwardly of the chuck, the tooth engaged will automatically and resiliently be centered between the spaced projections 18 which are so formed that they will positively contain the gear tooth and position it so as to seat it in substantially co-extensive surface contacting relation thereto. This locator stud in this fashion leaves no room for displacement of the gear 13 from its fixed positioning relative the chuck body 12. The containment of the gear tooth is positive due to this co-extensive surface contact between the adjacent walls of the projections 18 and the tooth contained. The form of the stud provides a substantially greater area of contact with the gear than would be provided by balls or cones. This insures a longer operating life for the stud and a greater degree of accuracy in the machining the gears held thereby. Moreover, the machining force applied to the gear will result in direct axial compression of the contained tooth which does not spread the gear teeth apart and substantially eliminates the possibility of damaging the gear supporting surface. Also, the containment of the gear tooth prevents any denting or damage to its operating surfaces.

Fig. 3 of the drawing shows the locator stud 10 of Figs. 1 and 2 in application to a different type of gear 23. In this instance the stud 10 is mounted to have its bifurcated head 16 axially related to a chuck body and projecting perpendicularly from its operating face. The base of the groove 19 is again formed to run parallel to the face of the gear being chucked and the surfaces 21 providing the extremities of the projections 18 define a plane angularly related to the central axis of the stud. The application and the function of the locator stud of Fig. 3 is identical with that of the stud of Figs. 1 and 2.

Figure 5:
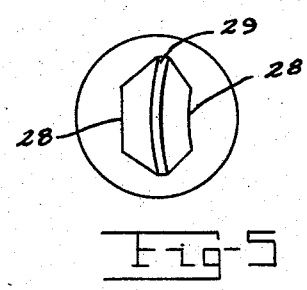
Fig. 5 is a view similar to Fig. 4 illustrating a modification of the locator stud in accordance with the invention.
Figure 7:
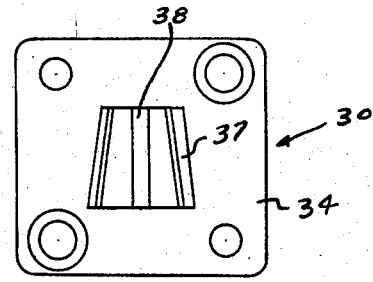
Fig. 7 is a plan view of the locator means shown in Fig. 6.
Figure 8:
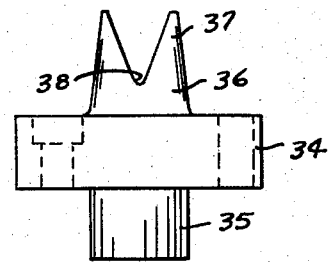
Fig. 8 is an elevation view of the device of Fig. 7.
Figure 9:
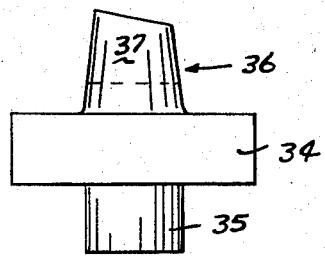
Fig. 9 is a side view of the locator means as shown in Fig. 8.

Fig. 5 is a plan view of a modification of the bifurcated head 16 on the stud 10 wherein the adjacent wall surfaces of the spaced projections 28 are so shaped to define a groove 29 curved to fit a spiral bevel, formate, hypoid-formate or zerol bevel spiral angle on a gear tooth. The modification adapts the studs to locate gears of the particular nature enumerated.

Figs. 6 to 9 illustrate a further embodiment of the invention. The locator unit 30 is shown in application to chuck body 32 for positioning a bevel type gear 33 thereto. This device includes a central plate like portion 34 of a generally rectagular nature. A short cylindrical projection 35 extends centrally from one face of the plate 34 while a generally conically formed bifurcated head 36 projects from its other face in axially aligned relation to the projection 35. Referring to Fig. 6 of the drawing, as in the first described embodiment herein, the chuck body 32 is provided with a stepped recess 40 to seat the projection 35 and the base plate 34 in its operating face so that the bifurcated head 36 projects from and perpendicular to such operating face. The bifurcated head 36 includes spaced tapered projections 37 defining a central groove 38 therebetween formed to receive and nest any one of the teeth of the gear to be positioned to the chuck body 32. The extremities of the projection 37 in this instance also define a plane angularly related to the central axis of this stud so they mutually seat to the lands to either side of the gear tooth that is contained therebetween on chucking. This embodiment of the invention functions similarly to the previously described embodiments. It is easily fabricated and precisely functions. The form of the projections 37 and their spacing is such that, as a gear is chucked to the body 32, certain of its teeth are approximately aligned with one or more of the locating studs projecting from the operating face of the chuck to be gently and resiliently centered and seated so there is substantial co-extensive surface contact between the adjacent side walls of the projections 37 and the opposite sides of a gear tooth in each instance. The positive containment of teeth in positioning the gear offers great improvements as applied in the art since a substantially higher degree of efficiency in machining operations results and there is minimum chance of damage either to the gear or locator stud in the process.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific feaures shown, but that the means and construction herein disclosed comprise but a few of several modes of putting the invention into effect.

Having thus described our invention, we claim:

1. A locating stud particularly applicable to gear chucks including, a base having means for connection thereof generally peripendicular to the operating face of a gear chuck, means projecting from said base having a grooved extremity, said extremity being formed to receive and resiliently center a gear tooth in contained relation thereto, the walls of the groove having surfaces mating coextensively with opposite sides of the tooth which it positions.

2. For use in combination with a gear chuck or the like, a locator stud including, base means for seating in the operating face of a chuck, laterally spaced projections on said base means generally perpendicular thereto for respectively engaging to either side of at least one of the teeth of a gear being chucked to guide it to a fixed position in contained surface contacting relation thereto.

3. A locator device for mounting in the operating face of a chuck including, a base element for engagement to the chuck, means generally perpendicularly connected to said base element for projection from the chuck to engage over a projecting element on a device being chucked to firmly position such device and automatically apply a singular direct compressive force on the projecting element as the device is chucked.

4. A locator stud particularly applicable to gear chucks including, a base portion having means for connection thereof to the operating face of a gear chuck, means projecting generally perpendicular to said base portion adapted to project relative the chuck operating face and having a grooved extremity for receiving and centering a gear tooth in contained relation thereto as a gear is chucked, said grooved extremity terminating in a plane inclined to said base portion.

5. For use in combination with a gear chuck or the like, a locating device comprising, base means for seating in the operating face of a chuck, a bifurcated projection from said base means defining a groove for frictionally accommodating a tooth on a gear as it is applied to the chuck, the walls of the groove having surfaces mating co-extensively with opposite sides of the tooth which it positions whereby to positively position the gear for machining or the like, the groove defined by said bifurcated projection being helical in form to adapt it to bridge a tooth of a spiral bevel gear or the like.

6. For use in combination with a gear chuck or the like, a locating device including, base means for fixing in the operating face of a chuck body, spaced means projecting from said base means, said spaced means having their respectively adjacent sides sloped and defining a groove therebetween to receive and contain at least a portion of the teeth of a gear as it is applied to the chuck body.

7. The structure as set forth in claim 6 wherein the outer most surface of each of said spaced means is inclined relative the central axis of said base means to adapt the locating device to bridge and nest teeth of a bevel type gear.

8. For use in combination with a gear chuck or the like, a locating device including, a rectangular base plate for seating in the operating face of a chuck body, laterally spaced projections on said base plate adapted to have their inner extremities flush with the operating face of the chuck body, said laterally spaced projections being cooperatively formed at their most adjacent surfaces for respective containment of relatively opposite faces of teeth on a gear as it is chucked to said chuck body.

9. For use in combination with a gear chuck or the like, a locating device including, a cylindrical shank for press fit seating in a cylindrical recess in the operating face of a chuck, means defining a flange on said shank for flush seating in the operating face of the chuck and a tapered head on said flange means aligned with said shank for projection from the chuck operating face, said head being centrally recessed to receive a tooth of a gear chucked for lateral containment thereof to prevent displacement of the gear relative the chuck.

10. In combination, a chuck body having a stepped recess in its operating face, a stud including a base portion and a stem mutually seated in said stepped recess, an axially projecting head on said stud having a groove in its outer extremity outwardly of said chuck operating face and means to either side of said groove for centering at least one gear tooth therein as a gear is chucked to said body, said means having surface portions for oppositely abutting gear teeth as they are chucked to prevent their rotative displacement and place them under axial compression during machining operations.

11. The structure as set forth in claim 10 wherein said surface portions are formed to have adjacent inwardly convergent surfaces for resiliently guiding gear teeth on chucking of a gear to said chuck body.

12. The structure as set forth in claim 11 wherein said stud is angularly set in said chuck body and said head has an extremity angularly related to its central axis.

References Cited in the file of this patent

UNITED STATES PATENTS

| | | |
|---|---|---|
| 2,543,117 | Mackmann | Feb. 27, 1951 |
| 2,565,430 | Hohwart et al. | Aug. 21, 1951 |
| 2,783,050 | Garrison et al. | Feb. 26, 1957 |